May 12, 1936.                P. SELENYI                2,040,571
DISCHARGE VESSEL AND METHOD OF MAKING SAME
Filed Aug. 20, 1930
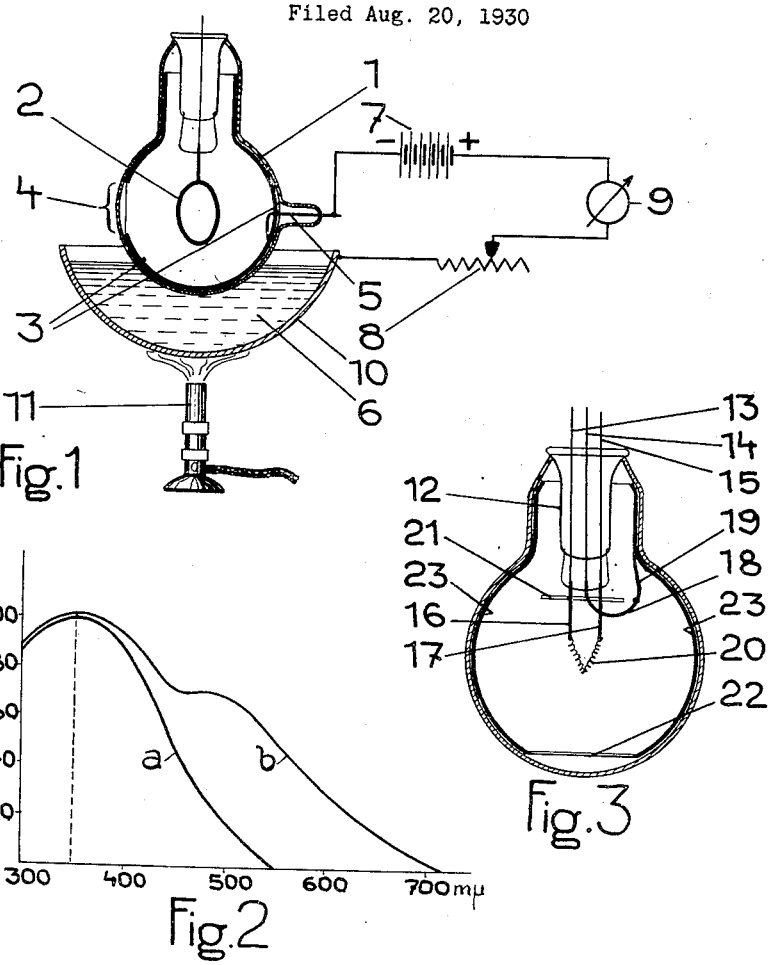

Patented May 12, 1936

2,040,571

UNITED STATES PATENT OFFICE 2,040,571

DISCHARGE VESSEL AND METHOD OF MAKING SAME

Paul Selényi, Budapest, Hungary, assignor to Egyesult Izzolampa es Villamossagi rt., Ujpest, Hungary, a corporation of Hungary Application August 20, 1930, Serial No. 476,621
In Hungary and Austria August 28, 1929

13 Claims. (Cl. 250—27.5)

My invention refers to electrical devices and quite especially to devices comprising a glass wall or glass vessel. It more particularly relates to means for introducing the products of decomposition of the glass and more particularly alkali metal cations or oxygen anions into such devices. My invention is applicable for instance to the production of the cathodes of electric discharge tubes and of the tubes themselves.

It is well known in the art that at a predetermined high temperature glass is rendered conductive, this conductivity having an electrolytical character, i. e. the flow of current through the glass is accompanied by a deposition of alkali metals, for instance sodium, as cation on the cathode side of the glass, the amount of deposited metal corresponding exactly to Faraday's rule. It has already been suggested to utilize this deposition of metal for the introduction of alkali metals into evacuated discharge vessels. To this end a filament is provided within the vessel which during the electrolytical process forms the cathode, the electron emission of which furnishes the current required for the electrolysis, while the anode is formed by a conductor connected with the outer surface of the glass vessel, for instance by a body of molten salt the vessel being partly submerged in the molten salt at the required temperature.

I have now discovered that this method, viz. the introduction of the metal cations contained in the glass into the interior of the vessel can also be carried out with advantage in such manner that a thin metal layer which need not be thicker than one thousandth of a millimetre, deposited on the inner surface of the glass wall and provided with a lead may be used as cathode. I have found that the metal set free, such as for instance sodium, which enters the vessel in the form of vapor, will freely diffuse through the thin metal layer and in depositing on the colder portions of the vessel will form a coherent mirror-like coating.

Obviously in many cases this method will be more convenient and preferable and offers far more possibilities of application than the known method. For while the glow cathode arranged within the vessel can only be used as cathode, the metal layer deposited on the inner surface of the vessel can be made to serve as anode, if the poles of the electric current supply are exchanged. I have found that in this case an amount of oxygen corresponding to Faraday's rule is set free at the metal layer, which—provided that it does not combine with the metal at the temperature prevailing during the process—will diffuse through the metal layer and will enter the vessel. I am thus enabled to introduce exactly predetermined quantities of oxygen into vessels consisting wholly or partly of glass or being connected with such vessels, open or sealed. This method may therefore be used for many purposes in the production of electric discharge vessels.

In the drawing affixed to this specification and forming part thereof some embodiments of my invention are illustrated diagrammatically by way of example.

In the drawing

Fig. 1 is an elevation, partly in section, of a photoelectric tube and the means for carrying out the electrolytic process, Fig. 2 illustrates curves showing the colour sensitiveness of photoelectric tubes, Fig. 3 is an elevation of a photoelectric tube comprising a glow cathode.

Referring to the drawing and first to Fig. 1, which shows the application of my invention to the formation of cathodes in the sealed vessels of photoelectric tubes, 1 is the glass vessel and 2 is a metal ring mounted therein and serving as anode. The inner surface of the glass wall is covered with a thin metal layer 3 produced by any known method before the sealing of the vessel. 4 is a gap left in the metal layer to allow the entrance of light. The metal coating is electrically connected with the lead 5 sealed into the glass wall.

In order to carry out the electrolytical decomposition of the glass the lower portion of the bulb is submerged in a molten body 6 of salt, for instance sodium nitrate. The electrolytic current is supplied by a battery 7, the negative pole of which is connected to the lead 5, the positive pole by means of a control resistance 8 and an ammeter 9 to a metal cup 10 containing the molten salt. Heat is supplied to the melt by a Bunsen burner 11.

This arrangement may be used for several purposes and more particularly for the production of photoelectric tubes of various designs. It is adapted in the first line for the introduction into the interior of the vessel of the alkali metals, for instance sodium, contained in the glass, i. e. for the production of photoelectric tubes in which such metal is used as active cathode metal. To this end the electrolytic circuit need merely be closed and the current maintained for a suitable time, whereupon the corresponding quantity of metal will enter the vessel as cation and will form a metal coating covering uniformly the colder portions of the vessel wall. In order to accelerate the condensation I prefer cooling that portion of the bulb which is not submerged in the molten salt, by means of an air current. The quantity of alkali metal introduced into the vessel may be very small, for instance not more than a few milligrams.

I have further discovered that far more efficient photoelectric cathodes can be obtained by providing the cathode surface with an oxide layer. In order to accomplish this the poles of the electrolytical current supply are reversed, the metal layer 3 now becoming the anode, whereupon oxygen is set free in the vessel and is fixed at once by the alkali introduced before. If a sodium cathode is used the depositing of the oxide layer can easily be observed because the silver-white sodium layer is coloured by the oxidation changing from a slight yellow to violet blue. These sodium oxide cathodes not only possess a light sensitiveness which is about five times higher than that of an ordinary sodium cathode, but also their curve of color sensitiveness is shifted in the direction towards the longer wave lengths, i. e. towards the red end of the spectrum. In order to show this in Fig. 2 the wave length is plotted as the (horizontal) abscissa, the relative sensitiveness as the (vertical) ordinate. Curve $a$ relates to an ordinary photoelectric sodium cathode, curve $b$ to a sodium oxide cathode produced according to my invention. While in sodium cathodes only the violet blue and to some extent also the green rays are active, the maximum efficiency being at about 350 $\mu\mu$, i. e. within the ultraviolet portion of the spectrum, the sodium oxide cathode is color-sensitive all over the entire visible spectrum including the yellow and the red. Therefore photoelectric tubes comprising sodium oxide cathodes are particularly adapted for photometric purposes. It has been found for example that the light-electric current produced by such a tube is proportional within 1% to the light intensity measured by the eye. This is true within a rather large interval of the lighting intensity and the color composition of the light. For instance in a gas-filled incandescent lamp of 105 volts and 100 watts the voltage is varied between 72 and 122 volts, the light intensity from 25 to 200 Hefner candles and the specific consumption from 2.1 to 0.62 watt per Hefner candle. By means of the method according to my invention it is further possible to shift the curve of light sensitiveness of sodium further in the direction of the longer wave lengths and to thus produce sodium cathodes sensitive for infra-red rays. The same applies even to a higher extent to potassium metal, the color sensitiveness of which may be increased up to and far beyond 800 $\mu\mu$.

According to another embodiment of the method herein disclosed, instead of the active metal, for instance sodium, forming the cathode the carrier of the cathode, for instance the metal layer 3, is provided with an oxide layer, of which the active material proper is deposited subsequently. In this case the metal layer 3 preferably consists of copper which is readily oxidized at the usual temperature of the molten salt, i. e. 200–300° C. If the metal layer consists of a metal such as for instance nickel which is not oxidized at this temperature, the layer should be heated to the temperature required for the oxidation, for instance by electrical means.

Referring now to Fig. 3, the inner metal layer may be produced within the sealed vessel. To this end the bulb encloses a stem 12 carrying three current leads 13, 14, and 15 and three supports 16, 17, 18. The supports 16 and 17 carry tungsten coils 20 coated galvanically with copper. The copper coating will afterwards evaporate in the evacuated bulb and deposit on the inner wall, forming the metal layer carrying the active cathode material. A wire 19 is welded to the support 18 and bent in such manner that it may be sealed in the surface of the bulb neck when the stem 12 is sealed in the bulb. Mica sheets 21 and 22 are preferably arranged on the stem 12 and in the opposite end of the bulb in order to protect the stem and the upper part of the bulb against the deposition of metal. The bulb is evacuated, sealed and provided with a base (not shown) of the type used for valves in order to facilitate the further operations. Now the metal coating (for instance copper) of the heating filament 20 is vaporized by heating the tungsten coil by the electric current. The vaporized copper is deposited on the inner wall of the bulb to form a coherent metal coating 23 serving as carrier of the light-sensitive cathode metal proper, the coating being electrically connected by means of the metal wire 19 with the support 18 and the lead 14. The further treatment can be carried out in different ways. For instance oxygen can first be introduced into the bulb by means of electrolytical decomposition of the glass, whereby the carrier material such as the copper coating on the wall of the bulb is oxidized. Thereafter the active material proper may be deposited on the coating also by means of electrolytical decomposition.

During the first step, i. e. the introduction of the oxygen, the metal coating 23 serves as anode in the electrolytic process, while in the introduction of the sodium the cathode may be formed either by the metal coating 23 or by the tungsten coil 20, which must then be heated to act as glow cathode.

As described in connection with Fig. 1 a cathode may be formed in such manner that instead of the carrier metal, for instance the copper coating, the active metal, i. e. the sodium is provided with a thin oxide layer. To this end, after the copper has vaporized, sodium is introduced in the bulb first and only thereafter oxygen. According to the generally accepted theory the high emission of such cathode provided with an oxide layer is due to an extraordinary film of the active metal, for instance alkali or alkaline earth metal, which is absorbed by and distributed on the surface of the oxide layer. In consequence thereof seemingly the last step should be the introduction of the alkali metal, but experience has shown that the metal coating, the thickness of which may perhaps amount only to the diameter of a molecule, is formed by itself on the oxidized sodium surface. For if after the oxidation of the sodium surface, which can be ascertained by the change of colour, the tube is allowed to stand, the cathode becomes active by itself, its light sensitiveness as a whole and its colour sensitiveness for yellow and red rays increasing gradually. This phenomenon occurs during 1–2 hours; very slight changes may still be observed after 1–2 days, but thereafter the tube has reached a state of complete stability.

According to another embodiment of my invention which represents perhaps the simplest mode of cathode production, the carrier metal of the cathode may be omitted and the active metal, for instance sodium, may be deposited directly on the glass wall. In this case the heating filament 20, shown in Fig. 3, is used in order to introduce sodium into the vessel, the metal coating, for instance the copper coating mentioned above, being, however, omitted. First the sodium is introduced into the evacuated and sealed bulb and deposits on the upper cooled portion of the bulb in the form of a coherent coating. However, this sodium coating cannot be used as anode for the introduction of oxygen, since when dipping this portion of the bulb into the molten salt the coating would melt and partly vaporize and would lose the greater part of its photoelectric sensitiveness. This difficulty can, however, be overcome in a very simple manner by forming the carrier of the heating filament of a metal of higher melting point, for instance nickel, and dimensioning it in such manner that when the filament is overloaded with current to a limited extent the carriers are vaporized to an appreciable extent, particularly at the attaching points. By this vaporization of nickel, which is preferably brought about simultaneously with or previous to introducing sodium, a thin metal layer is formed on the wall of the bulb, this layer, when used as anode, serving for the introduction of the oxygen required for oxidizing the sodium surface.

The examples described above merely deal with the production of photoelectric tubes, in which the active cathode material is recovered from the glass by electrolytic decomposition. Obviously the active material can also be procured by other means, for instance by the evaporation of a pill containing the active metal, this pill having been placed beforehand in the vessel or in a vessel communicating with it, while the preparation of the cathodes can be accomplished by developing oxygen in accordance with the electrolytic decomposition process. The new method is applicable to evacuated as well as to gas-filled vessels. In the production of these vessels the invention is applicable whenever the introduction of alkali metals or of oxygen is necessary, desirable or advantageous. In many cases the inner metal coating, which is indispensable for the carrying out of the invention, is present in the vessel from the beginning or, if not, can be produced in a simple manner.

The invention may further be advantageously used for instance in the manufacture of discharge vessels comprising glow cathodes, because in these vessels alkali metals are frequently used as active materials and the oxide layer serving to increase the electron emission is commonly used in the production of such glow cathodes.

The formation of an alkaline earth metal oxide cathode which may for instance be produced by the evaporation process and may comprise an oxidized core wire, can be carried out in the following manner: The inner surface of the bulb wall or part of the same is coated with a thin metal layer which is connected as anode, and oxygen is introduced by electrolytical decomposition of the glass. Now, the tungsten filament serving as core wire is heated electrically whereby an oxide layer is produced on its surface. Finally the active layer is produced in a well known manner by condensing earth alkaline metal vapors, for instance barium vapors. According to this invention these three operations may also be carried out simultaneously. The oxidation of the carrier wire of the cathode may even be omitted altogether and the barium vapors may be produced simultaneously with the introduction of the oxygen. In this case the core wire of the cathode is first coated with a barium oxide layer and thereafter further quantities of barium are condensed. The great advantage offered by the new method, viz. the exact control of the amount of oxygen, is of particular importance in this case, for the oxidation of the tungsten wire must be effected very carefully since an unduly far reaching oxidation may cause local diminution of the diameter of the wire resulting in a breaking or premature burning of the wire.

In this application of the new method the same modifications may be used as described above in connection with the production of photoelectric cathodes. More particularly the method may be used for introducing alkali metals or oxygen or both in any desired sequence. The same is true of the production of gas filled discharge vessels with non-heated cathodes.

In photoelectric tubes a thin metal layer deposited on the inner surface of the bulb is commonly used as carrier of the cathode. It has already been suggested to use this arrangement in connection with discharge vessels with non-heated cathodes, and it is even possible to use it in connection with discharge vessels comprising glow cathodes. However, in this latter case the cathode should of course have an appreciable emission below the temperature at which the glass softens. This is the case for instance if the bulb is produced from a glass of high melting point, as cathode material being used for instance barium oxide or barium metal. The bulb is provided with a barium layer on its inner surface by developing and condensing barium vapors, and the oxygen obtained by electrolytical decomposition of the glass is introduced into the bulb, the barium layer serving as anode. The barium layer produced in this manner and oxidized on its surface has an electron emission of very low value. In consequence thereof such cathodes when used as glow cathodes have a relatively high electron emission already at low temperatures, if used as photoelectric cathodes, great color sensitiveness for long wave lengths, and if used as cold cathodes in a discharge tube filled with gas of low pressure, a very low cathode drop.

There are further possibilities of use for the method according to this invention. For instance the method of introducing predetermined quantities of oxygen into a discharge tube filled with gas of low pressure may be utilized for influencing the ignition voltage. Further the method of introducing sodium may be used with great advantage for the purificaiton of rare gases, for instance argon, in order to remove gaseous impurities therefrom.

In the claims accompanying this specification the term "glass vessel" is intended to include also vessels consisting only partly of glass or consisting of some material other than glass, but communicating with a glass vessel.

Various changes may be made in the details disclosed in the foregoing specification without departing from the invention or sacrificing the advantages thereof.

I claim:—

1. The method of producing alkali metal cathodes in closed glass vessels comprising depositing a thin metal coating on the inner wall of the vessel, connecting said coating as cathode in an electrolytical circuit, decomposing the glass by heating it in contact with a fused alkali metal salt and by the electrolytic action of said circuit to transport into said vessel part of the alkali metal forming part of the glass, and reversing the current in said circuit, whereby oxygen formed in the decomposition of the glass is transported into said vessel also.

2. The method of producing photoelectric tubes, comprising depositing inactive metal on an anode filament of the tube, supplying current to said filament to heat same and to cause vaporization of said inactive metal and condensation thereof to form a metal coating on the inner wall of the tube and thereafter connecting said coating as electrode in an electric circuit and decomposing the glass by the electrolytic action of the current in said circuit to form an active coating on said layer.

3. The method of producing photoelectric tubes, comprising depositing inactive metal on an anode filament of a glass tube, supplying current to said filament to heat same and to cause vaporization of said inactive metal and condensation thereof to form a metal coating on the inner wall of the tube connecting said coating as anode in an electrical circuit and supplying said circuit with current to decompose the glass, whereby oxygen is developed.

4. The method of introducing into a glass vessel products of decomposition of glass comprising depositing on the inner wall of said vessel a thin metal coating, connecting said coating as electrode in an electrolytical circuit, placing a body of fused salt in contact with the outer wall of said vessel to form the other electrode of said circuit and decomposing the glass by the electrolytic action of said circuit.

5. The method of introducing into a glass vessel alkali metal cations comprising depositing on the inner wall of the vessel a thin metal coating, connecting said coating as cathode in an electrolytical circuit, placing a body of fused salt in contact with the outer wall of said vessel to form the anode of said circuit and decomposing the glass by the electrolytic action of said circuit.

6. The method of introducing into a glass vessel oxygen anions comprising depositing on the inner wall of the vessel a thin metal coating, connecting said coating as anode in an electrolytical circuit, placing in contact with the outer wall of said vessel a body of fused salt forming the cathode of said circuit and decomposing the glass by the electrolytic action of said circuit.

7. The method of introducing into a closed glass vessel products of decomposition of glass comprising depositing on the inner surface of the glass wall of the closed vessel a thin coating of a metal resistive against oxidation at the temperature prevailing during electrolysis of the glass, placing a body of fused salt in contact with the outer wall of said vessel, connecting said metal coating and said body of molten salt in an electrolytical circuit, and decomposing the glass by the electrolytic action of said circuit.

8. The method of introducing into a closed glass vessel products of decomposition of glass comprising depositing a thin nickel coating on the inner surface of the glass wall of the vessel, placing a body of fused salt in contact with the outer wall of said vessel, connecting said nickel coating and said body of molten salt in an electrolytical circuit, and decomposing the glass by the electrolytic action of said circuit.

9. A discharge glass vessel comprising an anode, a thin metal layer covering part of the inner wall and an alkali metal originally forming part of the glass wall of said vessel combined with said metal layer, said metal layer forming the cathode.

10. A discharge glass vessel comprising an anode, a thin metal layer covering part of the inner wall and an oxide of an alkali metal originally forming part of the glass wall of said vessel combined with said metal layer, said metal layer forming the cathode.

11. A discharge glass vessel comprising an anode, a thin nickel layer covering part of the inner wall and an alkali metal originally forming part of the glass wall of said vessel combined with said nickel layer, said nickel layer forming the cathode.

12. A photoelectric tube comprising a glass vessel, an anode and a superficially oxidized cathode in said vessel, said cathode being constituted by part of the sodium originally present in the glass wall of said vessel, said cathode having a color sensitiveness extending over the entire visible spectrum including yellow and red.

13. In the process of manufacturing photoelectric tubes, the steps which comprise depositing a thin metal layer upon the inside wall of a glass tube and electrolyzing into said tube an alkali metal, originally forming part of the glass wall of said tube, and combining said alkali metal with said deposited metal layer.

PAUL SELÉNYI.